(12) United States Patent
Jung et al.

(10) Patent No.: US 9,853,682 B2
(45) Date of Patent: Dec. 26, 2017

(54) COMMUNICATIONS MODULE AND FRONT-END MODULE INCLUDED THEREIN

(71) Applicant: Samsung Electro-Mechanics Co., Ltd., Suwon-si (KR)

(72) Inventors: Seung Pil Jung, Suwon-si (KR); Young Pyo Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/080,715

(22) Filed: Mar. 25, 2016

(65) Prior Publication Data

US 2017/0085292 A1 Mar. 23, 2017

(30) Foreign Application Priority Data

Sep. 21, 2015 (KR) ........................ 10-2015-0133075

(51) Int. Cl.
  *H04B 1/44* (2006.01)
(52) U.S. Cl.
  CPC ...................... *H04B 1/44* (2013.01)
(58) Field of Classification Search
  None
  See application file for complete search history.

(56) References Cited

U.S. PATENT DOCUMENTS

| 6,317,608 | B1* | 11/2001 | Glocker | H04B 1/005 330/126 |
| 2004/0224643 | A1* | 11/2004 | Nakai | H04B 1/0057 455/78 |
| 2007/0075803 | A1* | 4/2007 | Kemmochi | H04B 1/0057 333/132 |
| 2010/0062727 | A1* | 3/2010 | Kemmochi | H04B 1/44 455/74 |
| 2010/0091752 | A1* | 4/2010 | Kemmochi | H03H 7/09 370/339 |
| 2013/0016632 | A1* | 1/2013 | Mujtaba | H04B 7/0608 370/275 |
| 2015/0072671 | A1* | 3/2015 | Rofougaran | H04B 1/44 455/418 |

FOREIGN PATENT DOCUMENTS

JP 2010-252346 A 11/2010
KR 10-2013-0056634 A 5/2013

* cited by examiner

*Primary Examiner* — David Bilodeau
(74) *Attorney, Agent, or Firm* — NSIP Law

(57) ABSTRACT

A communications module includes a front-end module including a common port configured to be connected to an antenna, a reception port configured to pass a reception signal, and a transmission port configured to pass a transmission signal, and a high frequency switch circuit connected to the reception port and/or the transmission port and configured to change signal routes for signals passing through the front-end module, wherein the front-end module is configured to amplify communications signals of different communications standards.

11 Claims, 5 Drawing Sheets

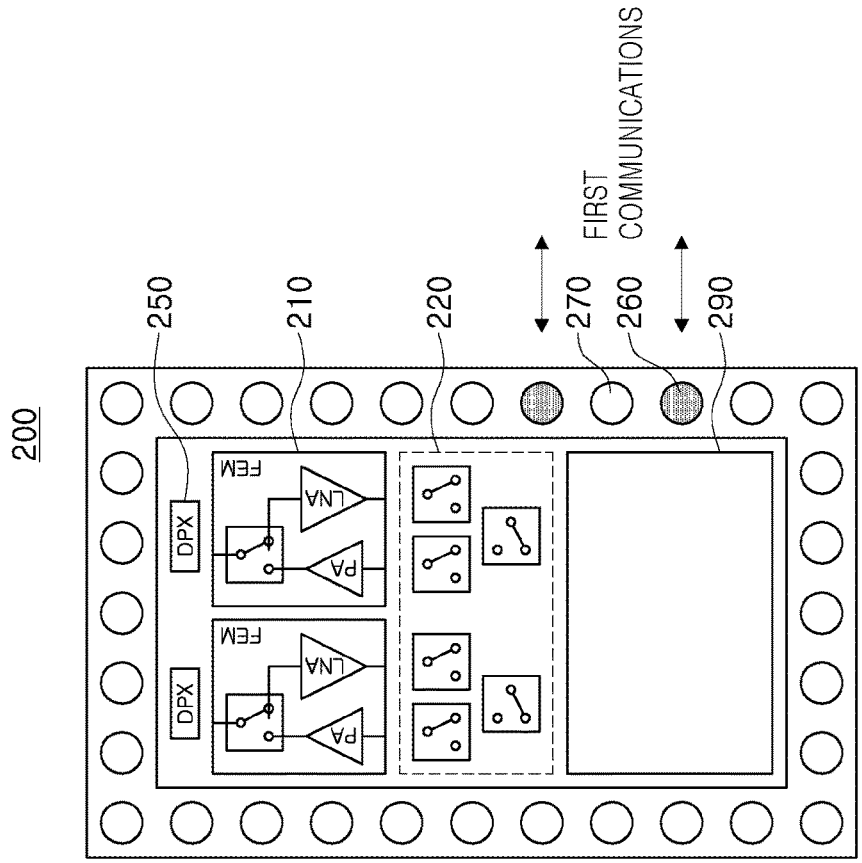
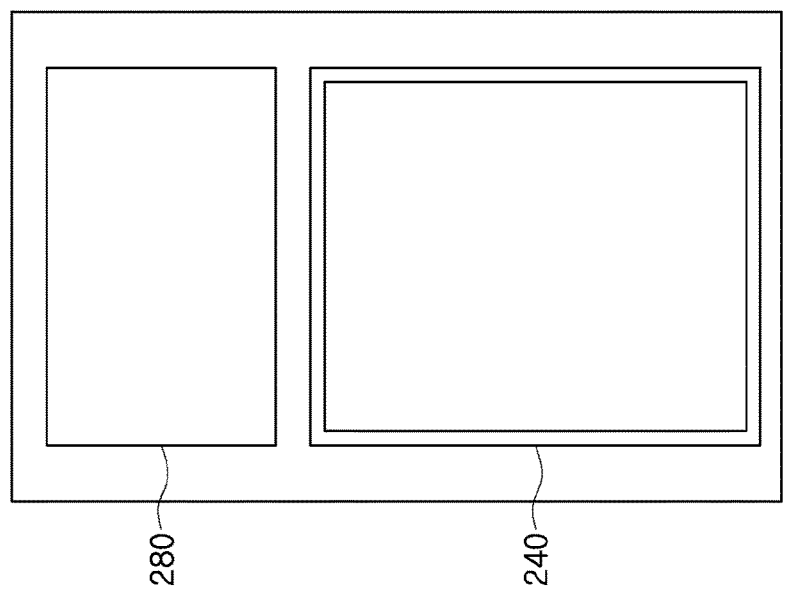
FIG. 7B
FIG. 7A

COMMUNICATIONS MODULE AND FRONT-END MODULE INCLUDED THEREIN

CROSS-REFERENCE TO RELATED APPLICATION(S)

This application claims the benefit under 35 U.S.C. §119 (a) of Korean Patent Application No. 10-2015-0133075, filed on Sep. 21, 2015 in the Korean Intellectual Property Office, the entire disclosure of which is incorporated herein by reference for all purposes.

BACKGROUND

1. Field

The following description relates to a communications module and a front-end module included therein.

2. Description of Related Art

With the development of wireless communications technology, various communications standards have been integrated in a single device. For example, a cellular communications standard and a Wi-Fi communications standard have been integrated in a single mobile terminal. As a result, one mobile terminal may support different communications standards.

With a recent, rapid increase in mobile traffic, the respective communications standards also gradually expand use of a frequency band. For example, the cellular communications standard has expanded from long term evolution (LTE) using an existing frequency band of 0.7 to 2 GHz to LTE-license assisted access (LTE-LAA) using a frequency band of 5 GHz. As mobile terminals get smaller, space which may be utilized in the mobile terminal is reduced. Thus, a reduction in size and cost of a communications module is desired.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a communications module includes a front-end module including a common port configured to be connected to an antenna, a reception port configured to pass a reception signal, and a transmission port configured to pass a transmission signal, and a high frequency switch circuit connected to the reception port and/or the transmission port and configured to change signal routes for signals passing through the front-end module, wherein the front-end module is configured to amplify communications signals of different communications standards.

The front-end module may further include a low noise amplifier configured to amplify the reception signal, a power amplifier configured to amplify the transmission signal, and a front switch configured to change the signal routes to transfer the reception signal from the antenna to the low noise amplifier and to transfer the transmission signal from the power amplifier to the antenna.

The front-end module may further include a bypass line connected between an input terminal and an output terminal of the low noise amplifier and configured to pass a transmission signal of a first communications standard, and the high frequency switch circuit comprises a first switch connected to the low noise amplifier and configured to perform a switching operation to change a route of the reception signal according to a communications standard of the reception signal.

The low noise amplifier and/or the power amplifier may be configured to adaptively adjust a gain based on a signal route state of the high frequency switch circuit.

The high frequency switch circuit may include a first switch connected to the reception port and configured to perform a switching operation to change a route of the reception signal depending on a communications standard of the reception signal, and a second switch connected to the transmission port and configured to perform a switching operation to change a route of the transmission signal depending on a communications standard of the transmission signal.

The high frequency switch circuit may further include a third switch configured to change a signal route to receive a reception signal of a first communications standard from the first switch, or to transfer a transmission signal of the first communications standard to the second switch.

The communications module may further include a coupler connected to the reception port and configured to divide the reception signal to change the signal route, wherein the high frequency switch circuit includes a second switch connected to the transmission port and configured to perform a switching operation to change a route of the transmission signal depending on a communications standard of the transmission signal.

The communications module may further include a communications modem configured to generate and process a transmission and reception signal of a second communications standard, and to transmit and receive the transmission and reception signal of the second communications standard to and from the high frequency switch circuit, wherein the high frequency switch circuit is configured to accept a control signal from the communications modem to change a signal route according to a preset period.

The communications modem may be configured to generate and process transmission and reception signals of the second communications standard of a plurality of frequency bands, and the front-end module may be configured to amplify a transmission and reception signal of first and second communications standards of a common frequency band.

The high frequency switch circuit may be disposed on a same layer as the front-end module, and may be configured to transfer a reception signal of a first communications standard and receive a transmission signal of the first communications standard through a pin, and transfer a reception signal of a second communications standard and receive a transmission signal of the second communications standard through a via.

According to another general aspect, a front-end module includes a low noise amplifier configured to receive reception signals of different communications standards and amplify the reception signals, a power amplifier configured to receive transmission signals of different communications standards and amplify the transmission signals, and a front switch configured to change a signal route to transfer the reception signal from an antenna to the low noise amplifier, and to transfer the transmission signal from the power amplifier to the antenna.

The low noise amplifier may be further configured to amplify a beacon signal identifying whether or not the reception signal is present.

The low noise amplifier and the power amplifier may be further configured to adaptively adjust a gain based on the communications standard of the received signal.

The low noise amplifier and the power amplifier may be further configured to independently amplify a plurality of transmission and reception signals of different communications standards in a time division multiplexing (TDM) scheme.

The low noise amplifier may be configured to transfer a reception signal of a first communications standard through a pin and to transfers a reception signal of a second communications standard through a via, and the power amplifier may be configured to receive a transmission signal of the first communications standard through the pin and to receive a transmission signal of the second communications standard through the via.

According to another general aspect, a front-end module, includes a shared amplifier, a high-frequency switch configured to be coupled to a first modem and a second modem sharing at least one frequency band, and to receive disparate communication standards from the first and second modem for selective routing to the shared amplifier, and, a controller coupled to the high frequency switch and the shared amplifier, the controller being configured for control of the high-frequency switch and adaptive adjustment of a gain of the amplifier based on an operation of the high-frequency switch.

The controller may be configured to adjust the gain of the shared amplifier based on an interconnective path difference from the shared amplifier to the first modem and to the second modem.

The controller may be further configured to control the high-frequency switch to collectively route disparate communication standards, in time division multiplexed manner, to the shared amplifier and a shared antenna according to a transmission frequency.

According to another general aspect, a communications modem, includes a shared amplifier, a high-frequency switch coupled to the shared amplifier, a communications port coupled to the high-frequency switch and configured to receive signals from an auxiliary communications modem disposed external to the communications modem, and, a controller configured to selectively actuate the high-frequency switch to route both a first communications standard and a different, second communications standard, from the auxiliary communications modem, to the shared amplifier.

The controller may be further configured to selectively route transmission signals of the first communications standard and the second communications standard to the shared amplifier or to a second shared amplifier, disposed external to the communications modem, based on an operational frequency band of the transmission signals.

Other features and aspects will be apparent from the following detailed description, the drawings, and the claims.

BRIEF DESCRIPTION OF THE DRAWINGS

FIG. 7A is an example layout illustrating a first layer of the communications module of FIG. 1.

FIG. 7B is an example layout illustrating a second layer of the communications module of FIG. 1.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
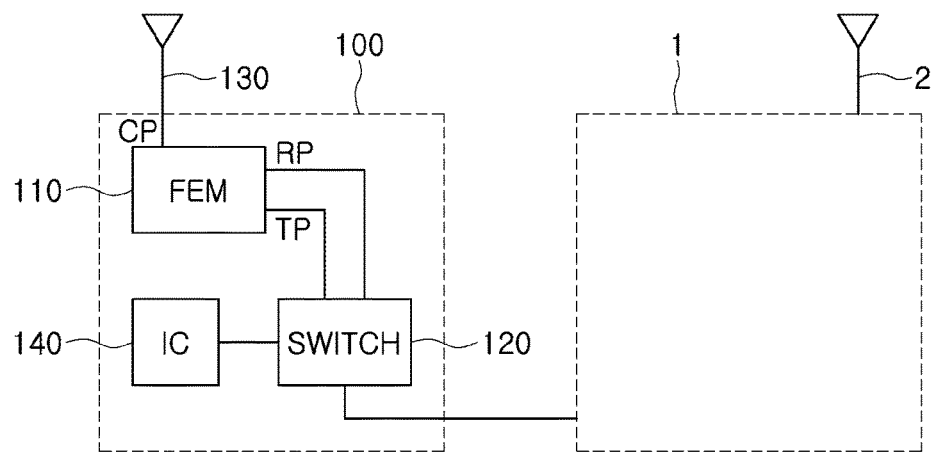
FIG. 1 is a diagram illustrating a communications module according to an embodiment.

FIG. 1 is a diagram illustrating a communications module according to an embodiment.

Referring to FIG. 1, the communications module 100 includes a front-end module (FEM) 110, a high frequency switch circuit 120, an antenna 130, and a communications modem 140. In FIG. 1, reference numeral 1 represents another communications module connected to the communications module 100, and reference numeral 2 represents an antenna included in the communications module 1.

The front-end module 110 includes a common port CP connected to the antenna, a reception port RP through which a plurality of reception signals of different communications standards pass, and a transmission port TP through which a plurality of transmission signals of different communications standards pass. The common port CP is connected to the antenna 130 to allow the transmission signal and the reception signal to commonly pass through the common port CP. At least one of the reception port RP and the transmission port TP are connected to the high frequency switch circuit 120. High frequency switch circuit 120 may include any switching elements suitable for providing, for example, time domain multiplexing between signals of different communications standards.

In addition, the front-end module 110 amplifies the transmission signal to be transferred to the antenna 130, and amplifies the reception signal to be transferred to the high frequency switch circuit 120.

For example, the front-end module 110 independently amplifies signals of a plurality of communications standards in a time division multiplexing (TDM) scheme. The front-end module 110 may be designed efficiently to amplify a specific frequency band. In a case in which frequency bands of a plurality of communications standards are common to the specific frequency band, the front-end module 110 may be designed to be tuned to one frequency band, thereby together amplifying the frequency bands of the plurality of communications standards.

The high frequency switch circuit 120 changes a signal route for a signal passing through the front-end module 110. That is, the high frequency switch circuit 120 performs a signal route change operation so as to electrically connect two of the front-end module 110, the communications modem 140, and an external connection unit such as communications module 1, and to disconnect the remaining one selectively.

For example, a reception signal of a first communications standard or a reception signal of a second communications standard is inputted to the high frequency switch circuit 120 through the reception port RP or port TP, and the high frequency switch circuit 120 transfers the reception signal of the first communications standard to a unit such as an externally connected pin for delivery to e.g. communications module 1, and transfers the reception signal of the second communications standard to the communications modem 140.

For example, a communications signal of the first communications standard passing through the communications module 100 is a transmission and reception signal of a cellular communications standard of a frequency band of 5 GHz. For example, a communications signal of the second communications standard is a transmission and reception signal of a Wi-Fi communications standard of frequency bands of 2 GHz and 5 GHz. Here, the communications signal of the first communications standard is defined as at least one of the transmission signal of the first communications standard and the reception signal of the first communications standard, and the communications signal of the second communications standard is defined as at least one of the transmission signal of the second communications standard and the reception signal of the second communications standard.

For example, the high frequency switch circuit 120 periodically changes a path of the signal according to the time division multiplexing (TDM) scheme. For example, the high frequency switch circuit 120 connects the front-end module 110 and the communications modem 140 to each other during a half of a preset period, and connect the front-end module 110 and the external connection unit (e.g. communications module 1) to each other during the remaining half of the preset period.

By changing the signal route by the high frequency switch circuit 120, the communications module 100 according to the embodiment commonly uses the front-end module 110 and the antenna 130 for the plurality of different communications standards. As a result, according to various embodiments, a space occupied by the entire communications module and cost of the entire communications module are reduced, an entire structure of the communications module is simplified, and amplification efficiency of the transmission signal and the reception signal are variously improved.

The communications module 100 according to the embodiment further includes the communications modem 140 that generates and processes the communications signal of the second communications standard.

At least a portion of a frequency band of the communications signal of the second communications standard is the same as a first frequency band which may thereby be efficiently amplified by the front-end module 110. Thus, the communications modem 140 transfers or receives the communications signal of the second communications standard of the first frequency band through the high frequency switch circuit 120, and transfers a signal of the remaining frequency band to another front-end module designed to be tuned to the remaining frequency band or receive the signal of the remaining frequency band from another front-end module designed to be tuned to the remaining frequency band. Further, the communications signal of the first communications standard of the first frequency band is transmitted and received through the communications module 100, and the communications signal of the first communications standard of a frequency band which is not the same as the first frequency band is transmitted and received through another communications module 1.

For example, an LTE signal of a frequency band of about 600 MHZ to about 2.4 GHz or about 700 MHz to about 2 GHz of the communications signal of the first communications standard is transmitted and received through a cellular antenna 2 included in another communications module 1. Further, an LTE-LAA signal of a frequency band of about 5 GHz of the communications signal of the first communications standard is applied to the communications module 100 which is primarily configured to support Wi-Fi communications and is transmitted and received through the antenna 130 which employs time division multiple access (TDMA) to transmit and receive a Wi-Fi communications signal. Thus, the communications module 100, according to the embodiment, supports communications of another communications module 1 without significantly changing a structure of the FEM 110 and antenna 130, when compared with a case in which only Wi-Fi communications are supported.

The communications module 100 according to the embodiment is also applied with the communications signal of the second communications standard as well as the communications signal of the first communications standard through the external connection unit. That is, the communications module 100 may not include the communications modem 140. Thus, the communications module 100 may be separated from the communications modem to also serve to commonly process the communications signals of the plurality of communications standards supplied from a plurality of disparate communication modems.

Further, the communications module 100 according to the example embodiment may also be applied to three or more kinds of communications standards. For example, the communications module 100 is externally applied with signals of the three or more kinds of communications standards through a plurality of pins. Here, the signals of the three or more kinds of communications standards are processed together by one front-end module 110 and one high frequency switch circuit 120.

Further, the communications module 100 according to the example embodiment may also be applied to a multiple input multiple output (MIMO) structure. Thus, the number of antennas 130 transmitting and receiving the Wi-Fi communications signal may also be multiple.

Figure 2:
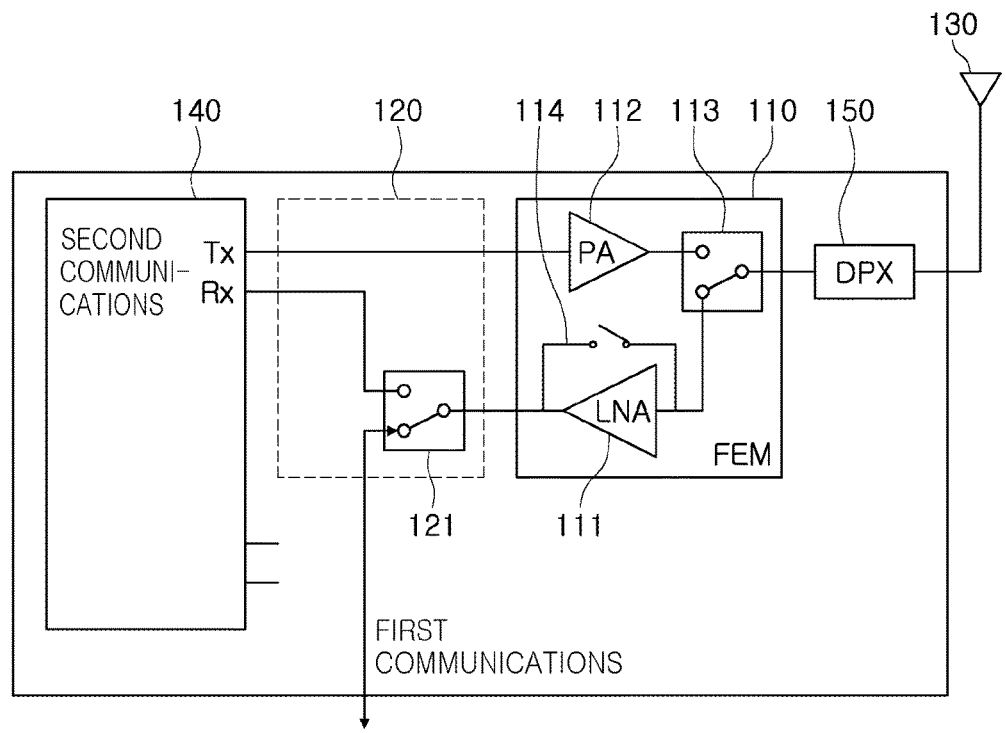
FIG. 2 is an example schematic design illustrating the communications module of FIG. 1.

FIG. 2 is a schematic design illustrating the communications module of FIG. 1.

Referring to FIG. 2, the front-end module 110 includes a low noise amplifier (LNA) 111, a power amplifier (PA) 112, and a front switch 113.

The low noise amplifier (LNA) amplifies a reception signal. The amplified reception signal is transferred to the high frequency switch circuit 120. Here, insertion loss of the high frequency switch circuit 120 is maintained at a level of about 0.5 dB, and deterioration in receiving sensitivity of the Wi-Fi signal is adaptively constrained by adjusting a gain of the low noise amplifier 111. Further, in a case in which the gain of the low noise amplifier 111 is sufficient, a difference between path loss up to the communications modem 140 and path loss up to another communications modem may be offset by a gain control of the low noise amplifier 111.

The power amplifier PA 112 is actuated to amplify a transmission signal. The amplified transmission signal is radiated through the antenna 130.

The low noise amplifier 111 receives the signals of the plurality of communications standards, and amplifies the received signals. For example, the low noise amplifier 111 may be designed to be efficiently operated for a specific frequency band. Thus, even in a case in which the plurality of signals amplified by the low noise amplifier 111 has different communications standards, but a common frequency band, the plurality of signals may still be efficiently amplified.

As the communications standards of the amplified signals are different, an amplification gain of the low noise amplifier 111 may be different. Thus, the low noise amplifier 111 may adaptively adjust a gain based on a signal route state of the high frequency switch circuit 120. For example, in a case in which path loss from the low noise amplifier 111 to another communications modem is greater than path loss from the low noise amplifier 111 to the communications modem 140, the low noise amplifier 111 may amplify the cellular signal to have the larger gain in compensatory manner. The amplification of the low noise amplifier 111 and/or the power amplifier 112 may also be adaptively adjusted based on other factors, such as regulatory, license-based limitations (e.g. transmission Watt limits) or for collective operation with other antennas to reduce, or increase, constructive or destructive interference such as in MIMO operational modes.

The front switch 113 changes the signal route so that the reception signal is transferred to the low noise amplifier 111 from the antenna and the transmission signal is transferred to the antenna from the power amplifier 112. For example, the front switch 113 changes the signal route so that the paths for the transmission signal and the reception signal, respectively, are changed in with a multiple access scheme such as e.g. a time division multiplexing, code division multiplexing, or frequency division multiplexing scheme.

Referring to FIG. 2, the front-end module 110 further includes a bypass line 114. For example, in a case in which the transmission signal of the first communications standard is amplified by another communications module 1, the transmission signal of the first communications standard is routed to pass through the high frequency switch circuit 120, pass through the bypass line 114, and pass through the front switch 113 to avoid amplification. Additionally, bypass line 114 may include, in some embodiments, a signal attenuator or reducer (not shown).

Referring to FIG. 2, the high frequency switch circuit 120 includes first switch 121 that selectively connects a reception terminal of the communications modem 140 or the external connection unit to the front-end module 110.

For example, the first switch 121 includes at least two transistors, and may be applied with a control signal from the communications modem 140 or another communications module 1 to perform a switching operation. That is, the communications modem 140, the other communication module(s) 1 and the first switch 121 are synchronized with each other. When the communications modem 140 receives a reception signal from the first switch 121, the first switch 121 is applied with a signal controlling the front-end module 110 and the communications modem 140 to be connected to each other from the communications modem 140.

The at least two transistors are connected between the front-end module 110 and the communications modem 140, and between the front-end module 110 and the external connection unit, respectively. When one of the at least two transistors is in an on-state, the remaining transistor may be in an off-state.

A specific operation will be described. The high frequency switch circuit 120 transfers the signal input from the front-end module 110 to the communications module 140 or the external connection unit, or may transfer the signal input from the communications module 140 or the external connection unit to the front-end module 110. For example, the high frequency switch circuit 120 connects the front-end module 110 and the communications modem 140 to each other during a first time period, and connects the front-end module 110 and the external connection unit to each other during a second time period. Alternatively, if the signal input from the front-end module 110 is the communications signal of the first communications standard, the high frequency switch circuit 120 transfers the signal input from the front-end module 110 to the external input unit, and if the signal input from the front-end module 110 is the communications signal of the second communications standard, the high frequency switch circuit 120 transfers the signal input from the front-end module 110 to the communications module 140.

The communications module 100 according to the embodiment further includes a diplexer (DPX) 150 performing a filtering operation for the signal transmitted and received through the antenna 130. The diplexer 150 is configured to perform the filtering operation for the transmission and reception signals of a plurality of different communications standards, similar to the front-end module 110 and the antenna 130.

Further, the communications modem 140 generates and processes communications signals of the second communications standard of a plurality of frequency bands. One of the communications signals of the second communications standard of the plurality of frequency bands passes through the front-end module 110, and the remaining communications signal is transferred to another front-end module and another diplexer designed to be tuned to the remaining frequency bands.

Figure 3:
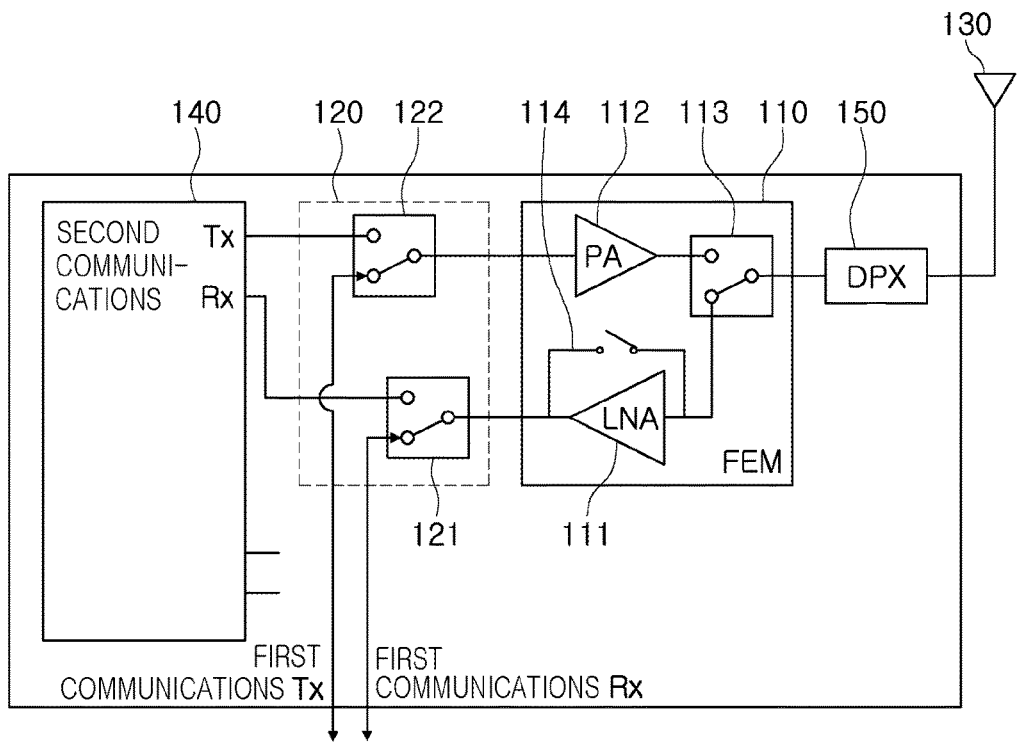
FIG. 3 is an example schematic design illustrating the communications module of FIG. 1.

FIG. 3 is a schematic design illustrating the communications module of FIG. 1.

Referring to FIG. 3, the high frequency switch circuit 120 includes the first switch 121 that selectively connects the reception terminal of the communications modem 140, or the external connection unit to which the reception signal is transferred, to the front-end module 110, and a second switch 122 that selectively connects a transmission terminal of the communications modem 140, or the external connection unit to which the transmission signal is transferred, to the front-end module 110.

Functions and operations of other components of FIG. 3 except for the second switch 122 may be easily understood with reference to FIG. 2, and accordingly, will not be repeated here for clarity and conciseness.

By changing a signal route for the transmission signal by the second switch 122, the front-end module 110 does not pass the communications signal of the first communications standard through the bypass line. In a case in which the transmission signal passes through the bypass line, power loss of about 2 to 3 dB may occur. Conversely, in a case in which the communications signal of the first communications standard passes through the second switch 122, power loss of the communications signal of the first communications standard may be less than 2 to 3 dB. Thus, the second switch 122 may also reduce power loss of the first signal while allowing the power amplifier 112 to commonly amplify the signals of the plurality of communications signals.

Since the power amplifier 112 generally amplifies a signal of high power, the power amplifier 112 consumes power greater than other components. Thus, the power amplifier 112 may be designed to have high power efficiency while occupying a wide space. Thus, by commonly amplifying the signals of the plurality of communications standards by the power amplifier 112, a total consumption power of the communications module 100 and another communications modem are significantly reduced.

Figure 4:
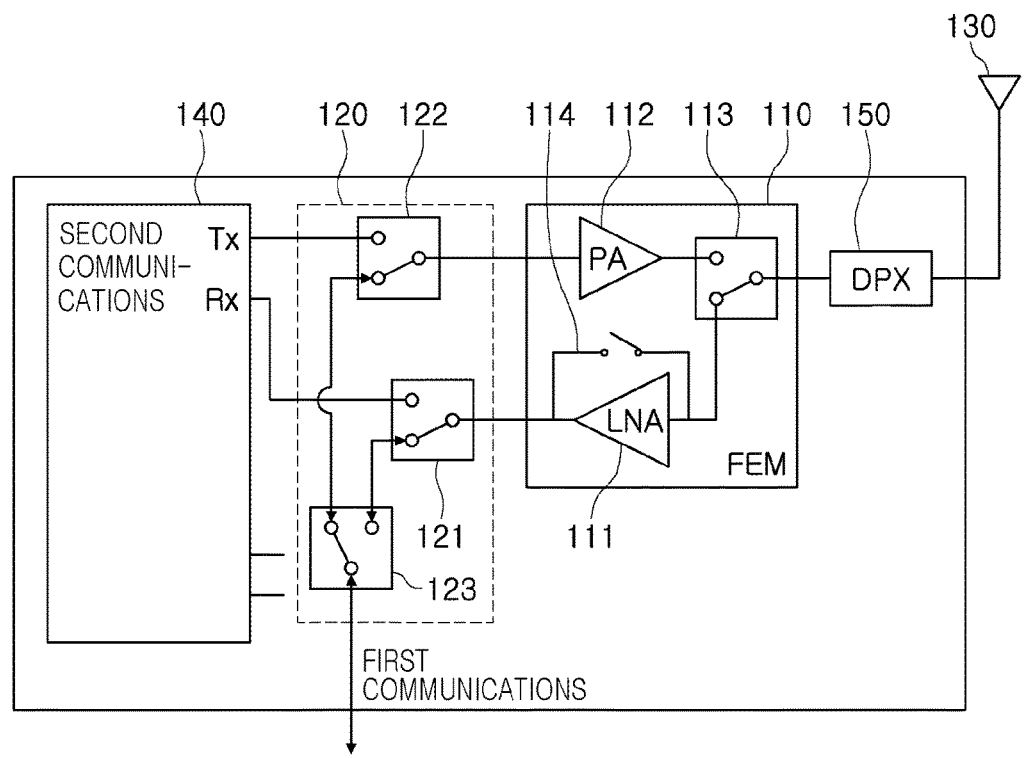
FIG. 4 is an example schematic design illustrating the communications module of FIG. 1.

FIG. 4 is a schematic design illustrating the communications module of FIG. 1.

Referring to FIG. 4, the high frequency switch circuit 120 further includes a third switch 123 changing the signal route in order to receive the reception signal of the first communications standard from the first switch 121 and transfer the transmission signal of the first communications standard to the second switch 122.

The third switch 123 reduces the number of lines and pins necessary to transmit and receive the communications signal of the first communications standard. Thus, a line structure of the communications module 100 according to the embodiment may be simplified.

For example, the third switch 123 is applied with a signal for changing a transmission and reception signal route of the communications modem 140. That is, the communications signal of the first communications standard and the communications signal of the second communications standard share a change schedule of the transmission and reception signal route with each other. Thus, a control for changing the transmission and reception signal route of the third switch 123 may be simplified.

Figure 5:
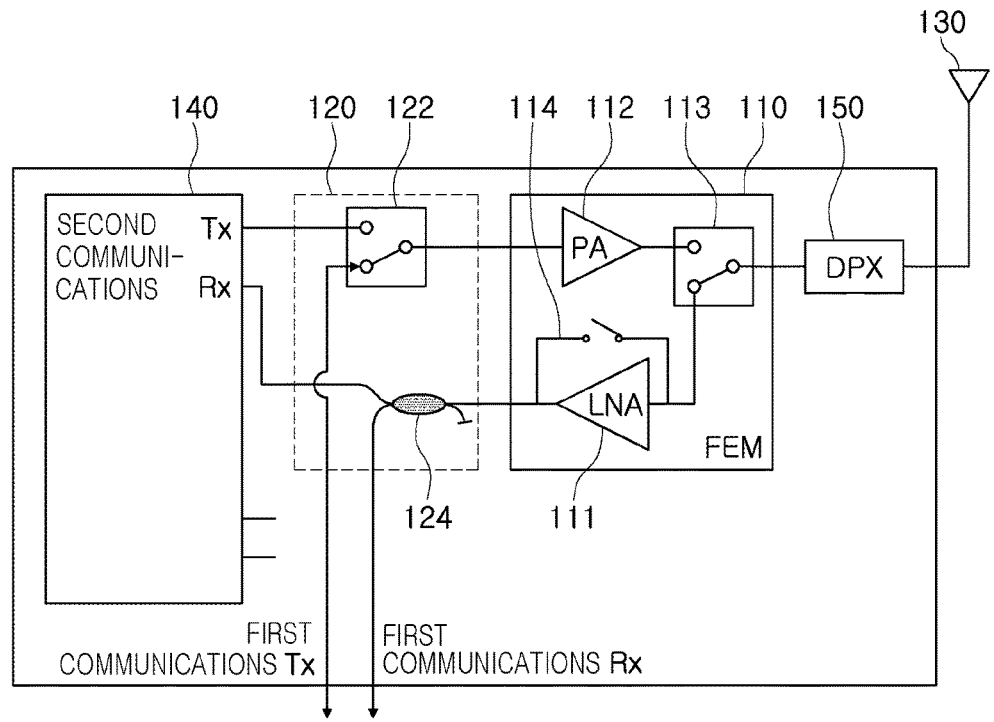
FIG. 5 is an example schematic design illustrating the communications module of FIG. 1.

FIG. 5 is a schematic design illustrating the communications module of FIG. 1.

Referring to FIG. 5, the high frequency switch circuit 120 includes the second switch 122 that selectively connects the transmission terminal of the communications modem 140, and the external connection unit to which the transmission signal of the first communications standard is transferred, to the front-end module 110, and a coupler 124 dividing the reception signal to change the signal route.

In a general communications environment, a terminal including the communications module 100 is woken up per a defined time (DTIM period), and identifies a beacon signal identifying whether or not data to be received is present. However, in a case in which a DTIM period for the first communications standard and a DTIM period for the second communications standard overlap each other, collision may occur at the high frequency switch circuit 120, which may also cause a problem in which the beacon signal for the first communications standard or the second communications standards is not identified. The coupler 124 may prevent the occurrence of the above-mentioned problem.

For example, the coupler 124 may be implemented in a 50:50 coupler dividing a first signal and a second signal at a ratio of 50:50 to change a signal route. The dividing ratio of the coupler 124 may be adaptively adjusted depending on a relative loss difference between a path of the first signal and a path of the second signal.

The coupler 124 may also be implemented in an RF pattern in a substrate. Thus, additional costs, parasitics, and power use according to the implementation of the coupler 124 may be significantly lowered. Further, loss according to an insertion of the coupler 124 may be as low as 3 dB or less. Thus, insertion loss according to the coupler 124 may be offset by the gain control of the low noise amplifier 111.

Figure 6:
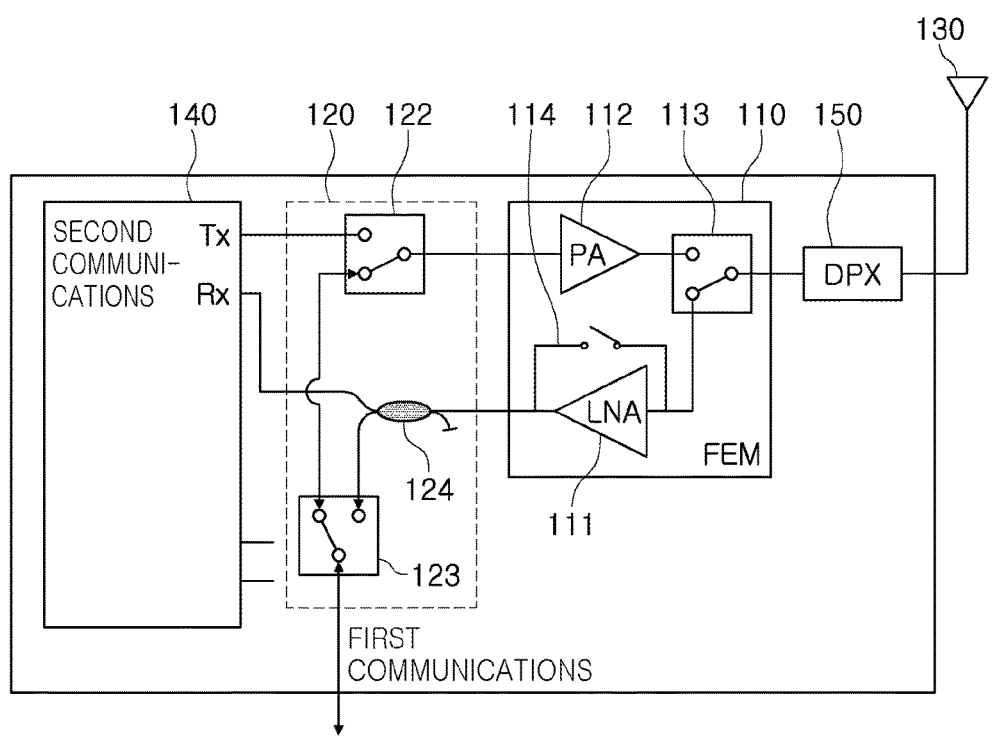
FIG. 6 is an example schematic design illustrating the communications module of FIG. 1.

FIG. 6 is a schematic design illustrating the communications module of FIG. 1.

Referring to FIG. 6, the coupler 124 may be connected to the third switch 123. The beacon signal is received through the antenna 130, is amplified by the low noise amplifier 111, changes a signal route by the coupler 124, and is transferred to the third switch 123 and the communications modem 140.

FIG. 7A is a layout illustrating a first layer of the communications module of FIG. 1.

FIG. 7B is a layout illustrating a second layer of the communications module of FIG. 1.

Referring to FIG. 7A and FIG. 7B, a communications module 200 according to an embodiment includes a front-end module 210, a high frequency switch circuit 220, a communications modem 240, a diplexer 250, a pin 260, a via 270, another frequency band communications circuit 280, and auxiliary circuit components 290.

The high frequency switch circuit 220 is disposed on the same layer as the front-end module 210, may transfer a reception signal of a first communications standard and receive a transmission signal of the first communications standard through the pin 260, and may transfer a reception signal of the second communications standard and receive a transmission signal of the second communications standard through the via 270.

Thus, the number of vias 270 included in a path of a first signal and a path of a second signal in the communications module 200 are significantly reduced, a size of the communications module 200 is significantly reduced, and performance deterioration of first communications and second communications modules may be significantly reduced.

For example, the high frequency switch circuit 220 and the front-end module 210 are disposed on a bottom surface of the communications module 200. Since the pin 260 is disposed on the bottom surface, the number of vias 270 included in the path of the first signal and the path of the second signal may be significantly reduced.

For example, the high frequency switch circuit 220 and the front-end module 210 are disposed on a top surface of the communications module 200. Since the top surface is a surface with a relatively small height limit, a degree of freedom of a design of the front-end module 210 may be improved, and performance deterioration of the first communications and the second communications may be significantly reduced. Here, a switch changing the signal routes of the transmission signal and the reception signal in the high frequency switch circuit 220 is disposed on the bottom surface.

For example, in a case in which the communications module 200 is implemented in the MIMO scheme, the number of pins 260 may be multiple. Here, at least one ground pin may be disposed between a plurality of pins.

In the case in which the high frequency switch circuit 220 and the front-end module 210 are disposed on the bottom surface of the communications module 200, the communications modem 240 and another frequency band communications circuit 280 are disposed on the top surface of the communications module 200. Further, auxiliary circuit components 290 performing an auxiliary role may be disposed in a spare space of the bottom surface.

Meanwhile, the number of front-end modules 210 and diplexers 250 may be multiple in order to amplify signals for a plurality of frequency bands. Further, each of a plurality of front-end modules may also amplify the first signal and the second signal. To this end, the number of high frequency switch circuits 220 may also be multiple.

Figure 8:
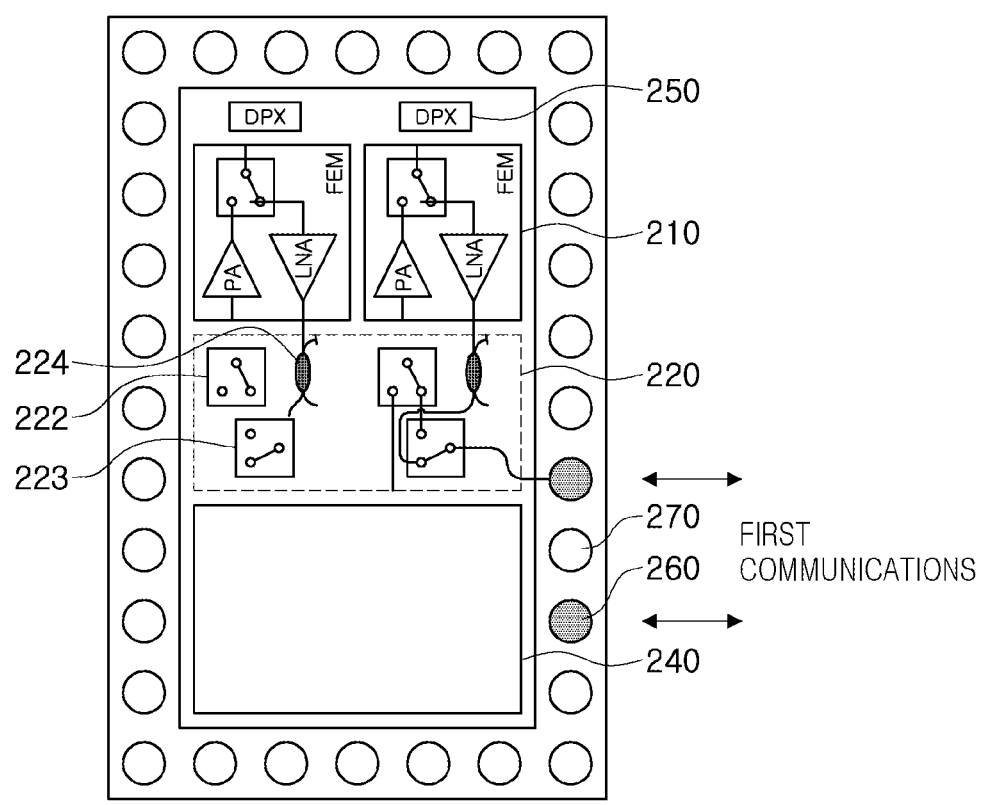
FIG. 8 is a layout illustrating a positional relationship of the communications module of FIG. 1.

FIG. 8 is a layout illustrating a positional relationship of the communications module of FIG. 1.

Referring to FIG. 8, the communications module 200 according to an embodiment includes the front-end module 210, the high frequency switch circuit 220, the communications modem 240, the diplexer 250, the pin 260, and the via 270 which are disposed on the same surface as each other. Further, the high frequency switch circuit 220 includes a second switch 222, a third switch 223, and a coupler 224.

Because the third switch 223 is directly connected to the pin 260, the third switch 223 may be disposed on the bottom surface regardless of the arrangement of the front-end module 210. As a result, performance deterioration of the first communications may be significantly reduced.

The coupler 224 may be replaced and/or supplemented with the first switch.

As set forth above, according to the embodiments, the communications module may be reduced in size, complexity, power usage, parasitics, and cost by commonly using an antenna and amplifiers for signals of different communications standards.

Further, the communications module, according to embodiments, may further be reduced in size and cost by commonly using the front-end module and the diplexer for the signals of the different communications standards, and may have reduced power loss by efficiently using the space and simplifying control measures.

The apparatuses, units, modules, devices, parts and other components (such as the communications module, IC, and controllers) that perform the operations described herein are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing. The methods illustrated that perform the operations described herein may be performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the structure illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include device firmware, read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a mobile terminal as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A communications module comprising:
a front-end module comprising a common port configured to be connected to an antenna, a reception port configured to pass a reception signal, and a transmission port configured to pass a transmission signal; and
a high frequency switch circuit connected to either one or both of the reception port and the transmission port, and configured to control signal routes for signals passing through the front-end module,
wherein the front-end module is configured to amplify communications signals of different communications standards in a time division multiplexing scheme,
wherein one of the signal routes is between the high frequency switch circuit and an inner communications modem, and another of the signal routes is between the high frequency switch circuit and an externally connected pin.

2. The communications module of claim 1, the front-end module further comprising:
a low noise amplifier configured to amplify the reception signal;
a power amplifier configured to amplify the transmission signal; and
a front switch configured to change the signal routes to transfer the reception signal from the antenna to the low noise amplifier and to transfer the transmission signal from the power amplifier to the antenna.

3. The communications module of claim 2, wherein the front-end module further comprises a bypass line connected between an input terminal and an output terminal of the low noise amplifier and the front-end module is further configured to pass a transmission signal of a first communications standard, and
the high frequency switch circuit comprises a first switch connected to the low noise amplifier, and the high frequency switch circuit is configured to perform a switching operation to change a route of the reception signal according to a communications standard of the reception signal.

4. The communications module of claim 2, wherein the low noise amplifier and/or the power amplifier are configured to adaptively adjust a gain based on a signal route state of the high frequency switch circuit.

5. The communications module of claim 1, wherein the high frequency switch circuit comprises:
a first switch connected to the reception port and configured to perform a switching operation to change a route of the reception signal depending on a communications standard of the reception signal; and
a second switch connected to the transmission port and configured to perform a switching operation to change a route of the transmission signal depending on a communications standard of the transmission signal.

6. A communications module, comprising:
a front-end module comprising a common port configured to be connected to an antenna, a reception port configured to pass a reception signal, and a transmission port configured to pass a transmission signal; and
a high frequency switch circuit connected to either one or both of the reception port and the transmission port, and configured to control signal routes for signals passing through the front-end module,
wherein the front end module is configured to amplify communications signals of different communications standards in a time division multiplexing scheme, and
wherein the high frequency switch circuit comprises a third switch configured to change a signal route to receive a reception signal of a final communications standard from a first switch, or to transfer a transmission signal of the first communications standard to a second switch.

7. The communications module of claim 1, further comprising a coupler connected to the reception port and configured to divide the reception signal to change the signal route,
wherein the high frequency switch circuit comprises a second switch connected to the transmission port and configured to perform a switching operation to change a route of the transmission signal depending on a communications standard of the transmission signal.

8. The communications module of claim 1, wherein
the inner communications modem is configured to generate and process a transmission and reception signal of a second communications standard, and to transmit and receive the transmission and reception signal of the second communications standard to and from the high frequency switch circuit, and
the high frequency switch circuit is configured to accept a control signal from the inner communications modem to change a signal route according to a preset period.

9. The communications module of claim 8, wherein the inner communications modem is configured to generate and process transmission and reception signals of the second communications standard of a plurality of frequency bands, and
the front-end module is configured to amplify a transmission and reception signal of first and second communications standards of a common frequency band.

10. The communications module of claim 1, wherein the high frequency switch circuit is disposed on a same layer as the front-end module, and is configured to transfer a reception signal of a first communications standard and receive a transmission signal of the first communications standard through the externally connected pin, and transfer a reception signal of a second communications standard and receive a transmission signal of the second communications standard through a via.

11. A communications module comprising:
   a front-end module comprising
      a reception port configured to receive, from an antenna, reception signals of different communications standards, and to pass the reception signals to a high frequency switch circuit, and
      a transmission port configured to receive, from the high frequency switch circuit, transmission signals of the different communications standards, and to pass the transmission signals to the antenna,
   wherein the high frequency switch circuit is configured to control signal routes of the reception signals out of the front end module, and to control signal routes of the transmission signals into the front-end module,
   wherein the front-end module is configured to amplify the reception signals prior to passing the reception signals to the high frequency switch circuit, and to amplify the transmission signals after receiving the transmission signals from the high frequency switch circuit, and
   wherein one of the signal routes is between the high frequency switch circuit and an inner communications modem, and another of the signal routes is between the high frequency switch circuit and an externally connected pin.

* * * * *